US011249995B2

United States Patent
Sirohi et al.

(10) Patent No.: US 11,249,995 B2
(45) Date of Patent: *Feb. 15, 2022

(54) TECHNIQUES AND ARCHITECTURES FOR PROVIDING AND OPERATING AN APPLICATION-AWARE DATABASE ENVIRONMENT WITH PREDICTIVE EXECUTION OF QUERIES AND QUERY FLOWS

(71) Applicant: salesforce.com, inc., San Francisco, CA (US)

(72) Inventors: Arjun Kumar Sirohi, Bellevue, WA (US); Vikas Taneja, Redmond, WA (US); Kim Lichong, Lake Forest Park, WA (US); Michael Allan Friedman, Bellevue, WA (US); Vidushi Sharma, Greater Noida (IN)

(73) Assignee: salesforce.com, Inc., San Francisco, CA (US)

(*) Notice: Subject to any disclaimer, the term of this patent is extended or adjusted under 35 U.S.C. 154(b) by 55 days.

This patent is subject to a terminal disclaimer.

(21) Appl. No.: 15/396,291

(22) Filed: Dec. 30, 2016

(65) Prior Publication Data
US 2018/0189349 A1 Jul. 5, 2018

(51) Int. Cl.
*G06F 16/2453* (2019.01)

(52) U.S. Cl.
CPC .............. *G06F 16/24539* (2019.01)

(58) Field of Classification Search
CPC ......... G06F 17/30457; G06F 17/30463; G06F 17/30595; G06F 17/30312; G06F 16/24539

USPC ........................................................... 707/717
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

OTHER PUBLICATIONS

"Database PL/SQL Packages and Types Reference", Oracle Corporation. Database PL/SQL Packages and Types Reference, accessed on World Wide Web at http://docs.oracle.com/database/121/ARPLS/d_appinf.htm#ARPLS65229, Oct. 29, 2016.

(Continued)

*Primary Examiner* — Hosain T Alam
*Assistant Examiner* — Robert F May
(74) *Attorney, Agent, or Firm* — Kwan & Olynick LLP

(57) ABSTRACT

Predictive execution of query flows in an application aware database environment. A repository of previously received and registered database queries along with at least corresponding metadata having information about database query flows generating the database queries is maintained. Application metadata corresponding to a subsequent database query is received. The repository is checked to determine if the application metadata matches one of the previously received and registered database query flows. One or more queries corresponding to the query flow from the repository is/are retrieved if a match is determined. Execution of the retrieved one or more database queries is started prior to receiving the query from outside the repository.

17 Claims, 5 Drawing Sheets

(56) References Cited

U.S. PATENT DOCUMENTS

| | | | |
|---|---|---|---|
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,466,931 B1* | 10/2002 | Attaluri | G06F 16/24524 |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,289,976 B2 | 10/2007 | Kihneman et al. | |
| 7,340,411 B2 | 3/2008 | Cook | |
| 7,523,094 B1* | 4/2009 | Thiemann | G06F 16/24539 |
| 7,548,905 B2* | 6/2009 | Burger | G06F 16/24542 |
| 7,620,655 B2 | 11/2009 | Larsson et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0171945 A1* | 8/2005 | Colrain | G06F 16/24552 |
| 2009/0177744 A1 | 7/2009 | Marlow et al. | |
| 2011/0029508 A1* | 2/2011 | Al-Omari | G06F 16/24542 707/718 |
| 2011/0246449 A1* | 10/2011 | Collins | G06F 16/24542 707/715 |
| 2012/0330924 A1* | 12/2012 | Rajan | G06F 16/2453 707/714 |
| 2013/0159286 A1* | 6/2013 | Manzano Macho | G06F 16/24552 707/718 |
| 2014/0304824 A1* | 10/2014 | Sirohi | G06F 21/6227 726/26 |
| 2015/0112965 A1* | 4/2015 | Tokuda | G06F 16/24553 707/718 |
| 2015/0149501 A1* | 5/2015 | Prakash | G06F 9/5027 707/769 |
| 2015/0347506 A1* | 12/2015 | Annapragada | G06F 16/24542 707/718 |
| 2016/0188696 A1* | 6/2016 | Belghiti | G06F 16/2272 707/718 |
| 2017/0024433 A1* | 1/2017 | Neelakanthappa | G06F 16/2255 |

OTHER PUBLICATIONS

"Database SQL Tuning Guide", Oracle Corporation. Oracle Database 12c Query Optimizer Concepts accessed on the World Wide Web at https://docs.oracle.com/database/121/TGSQL/tgsql_optcncpt.htm#TGSQL192, Oct. 25, 2016.

"Force.com Query Optimizer Secrets You Can Use Today", Salesforce.com. "Force.com Query Optimizer Secrets You Can Use Today" accessed on World Wide Web at https://developer.salesforce.com/blogs/engineering/2013/12/force-com-query-optimizer-secrets-you-can-use-today.html, Oct. 25, 2016.

(56) References Cited

OTHER PUBLICATIONS

"Query Optimization", Oracle Corporation. Oracle Database 12c Query Optimization overview accessed on the World Wide Web at http://www.oracle.com/technetwork/database/database-technologies/query-optimization/overview/index.html, Oct. 25, 2016.
"SQL Statement Processing", Microsoft Corporation. SQL Statement Processing, Optimizing SELECT Statements, accessed on World Wide Web at https://technet.microsoft.com/en-us/library/ms190623(v=sql.105).aspx, Oct. 25, 2016.
"The SQL and XQuery Compiler Process", IBM Corporation. The SQL and XQuery compiler process for DB2 UDB Version 11.1 accessed on World Wide Web at http://www.ibm.com/support/knowledgecenter/SSEPGG_9.7.0/com.ibm.db2.luw.admin.perf.doc/doc/c0005292.html, Oct. 25, 2016.
Bursztyn, Damian, et al., "Teaching an RDBMS About Ontological Constraints", Proc. VLDB Endow. 9, 12 (Aug. 2016), 1161-1172. DOI: http://dx.DOI.org/10.14778/2994509.2994532.
Chinneck, John, et al., "Real-Time Multi-Cloud Management Needs Application Awareness", In Proceedings of the 5th ACM/SPEC international conference on Performance engineering (ICPE '14). ACM, New York, NY, USA, 293-296. DOI=http://dx.DOI.org/10.1145/2568088.2576763.
Dalvi, Nilesh N., et al., "Pipelining in Multi-Query Optimization", In Proceedings of the twentieth ACM SIGMOD-SIGACT-SIGART symposium on Principles of database systems (PODS '01). ACM, New York, NY, USA, 59-70. DOI=http://dx.DOI.org/10.1145/375551.375561.
Du, Linna "Pricing and Resource Allocation in a Cloud Computing Market", In Proceedings of the 2012 12th IEEE/ACM International Symposium on Cluster, Cloud and Grid Computing (ccgrid 2012) (CCGRID '12). IEEE Computer Society, Washington, DC, USA, 817-822. DOI=http://dx.DOI.org/10.1109/CCGrid.2012.148.
Epstein, Robert, et al., "Design Decisions for the Intelligent Database Machine", In Proceedings of the May 19-22, 1980, National Computer Conference (AFIPS '80). ACM, New York, NY, USA, 237-241. DOI=http://dx.DOI.org/10.1145/1500518.1500553.
Haijat, Mohammad, et al., "Dealer: Application-Aware Request Splitting for Interactive CLoud Applications", In Proceedings of the 8th international conference on Emerging networking experiments and technologies (CoNEXT '12). ACM, New York, NY, USA, 157-168. DOI=http://dx.DOI.org/10.1145/2413176.2413195.
Kozuka, Nobuaki, et al., "Building a Product Line Architecture for Variant-Rich Enterprise Applications Using a Data-Oriented Approach", In Proceedings of the 15th International Software Product Line Conference, vol. 2 (SPLC '11), Ina Schaefer, Isabel John, and Klaus Schmid (Eds.). ACM, New York, NY, USA, Article 14, 6 pages. DOI=http://dx.DOI.org/10.1145/2019136.2019152.
Li, Fei, et al., "Constructing an Interactive Natural Language Interface for Relational Databases", Proc. VLDB Endow. 8, 1 (Sep. 2014), 73-84. DOI=http://dx.DOI.org/10.14778/2735461.2735468.
Lin, Xue "Query Optimization Strategies and Implementation Based on Distributed Database", Computer Science and Information Technology, 2009. ICCSIT 2009. 2nd IEEE International Conference on, Beijing, 2009, pp. 480-484. DOI: 10.1109/ICCSIT.2009.5234507, URL: http://ieeexplore.ieee.org/stamp/stamp.jsp?tp=&arnumber=5234507&isnumber=5234374.
Manegold, Stefan, et al., "A Multi-Query Optimizer for Monet", In BNCOD, 2000, 15 pgs.
Mekky, Hesham et al., "Application-Aware Data Plane Processing in SDN", In Proceedings of the third workshop on Hot topics in software defined networking (HotSDN '14). ACM, New York, NY, USA, 13-18. DOI: http://dx.DOI.org/10.1145/2620728.2620735.
Narasayya, Vivek, et al., "SQLVM: Performance Isolation in Multi-Tenant Relational Database-as-a-Service", In Proceedings of the 2013 ACM SIGMOD International Conference on Management of Data (SIGMOD '13). ACM, New York, NY, USA, 1077-1080. DOI: http://dx.DOI.org/10.1145/2463676.2463686.
Re, Christopher, et al., "Machine Learning and Databases: The Sound of Things to Come or a Cacophony of Hype?", In Proceedings of the 2015 ACM SIGMOD International Conference on Management of Data (SIGMOD '15). ACM, New York, NY, USA, 283-284. DOI: http://dx.DOI.org/10.1145/2723372.2742911.
Sirohi, Arjun K., et al., "Context Sensitive Indexes", May 2016. United States Patent Publication-US 2016-0140178 A1 titled "Context-Sensitive Indexes", Publication No. "2016-0140178" at http://portal.uspto.gov/pair/PublicPair.
Sirohi, Arjun K., et al., "Context-Sensitive Indexes in RDBMS for Performance Optimization of SQL Queries in Multi-Tenant/Multi-Application Environments", In Proceedings of the 17th International Conference on Enterprise Information Systems (ICEIS 2015), Barcelona, Spain, Apr. 27-30, 2015. ISBN: 978-989-758-096-3, pp. 259-270 DOI: 10.5220/0005350802590270.
Taft, Rebeccaet al., "STeP: Scalable Tenant Placement for Managing Database-as-a-Service Deployments", In Proceedings of the Seventh ACM Symposium on Cloud Computing (SoCC '16), Marcos K. Aguilera, Brian Cooper, and Yanlei Diao (Eds.). ACM, New York, NY, USA, 388-400. DOI: http://dx.DOI.org/10.1145/2987550.2987575.
Wu, Yongweiet al., "Adapting to Application Workflow in Processing Data Integration Queries", Sixth International Conference on Grid and Cooperative Computing (GCC 2007), Los Alamitos, CA, 2007, pp. 745-748. DOI: 10.1109/GCC.2007.38 URL: http://ieeexplore.ieee.org/stamp/stamp.jsp?tp=&arnumber=4293857&isnumber=4293747.
Xiong, Pengcheng "Dynamic Manegement of Resources and Workloads for RDBMS in CLoud: a Control-Theoretic Approach", In Proceedings of the on SIGMOD/PODS 2012 PhD Symposium (PhD '12). ACM, New York, NY, USA, 63-68. DOI=http://dx.DOI.org/10.1145/2213598.2213614.
Zeng, Qianget al., "QuickFOIL: Scalable Inductive Logic Programming", Proc. VLDB Endow. 8, 3 (Nov. 2014), 197-208. DOI=http://dx.DOI.org/10.14778/2735508.2735510.
Zhang, Astonet al., "Towards Mobile Query Auto-Completion: An Efficient Mobile Application-Aware Approach", In Proceedings of the 25th International Conference on World Wide Web (WWW '16). International World Wide Web Conferences Steering Committee, Republic and Canton of Geneva, Switzerland, 579-590. DOI=http://dx.DOI.org/10.1145/2872427.2882977.
Zhao, Shuaiet al., "Building Application-Aware Network Environments Using SDN for Optimizing Hadoop Applications", In Proceedings of the 2016 conference on ACM SIGCOMM 2016 Conference (SIGCOMM '16). ACM, New York, NY, USA, 583-584. DOI: http://dx.DOI.org/10.1145/2934872.2959059.
Non-Final Office Action for SFDC-P286 dated Oct. 5, 2018, 19 pages.
Final Office Action for SFDC-P286 dated Mar. 21, 2019, 21 pages.
Non-Final Office Action for U.S. Appl. No. 15/396,287 dated Sep. 19, 2019, 14 pages.
Final Office Action for U.S. Appl. No. 15/396,287 dated Mar. 5, 2020, 17 pages.
Notice of Allowance for U.S. Appl. No. 15/396,287 dated Oct. 30, 2020, 13 pages.

* cited by examiner

TECHNIQUES AND ARCHITECTURES FOR PROVIDING AND OPERATING AN APPLICATION-AWARE DATABASE ENVIRONMENT WITH PREDICTIVE EXECUTION OF QUERIES AND QUERY FLOWS

TECHNICAL FIELD

Embodiments relate to techniques for providing application-aware database functionality with query-flow optimization. More particularly, embodiments relate to techniques for utilizing information about an application, user, context and/or other information to provide a more efficient database environment.

BACKGROUND

Existing database management systems (DBMSs) are generic and not application aware. This means that the database has no knowledge of applications, modules, or queries. Without such knowledge the database is not in a position to pre-parse and/or cache queries, query flows, and query execution plans. As a result, when the application servers first connect to the database, it takes a relatively long time for the application servers to be ready to serve users. This database time is on top of the time that application servers themselves take to start the connection pools and send queries to the database. The total time for the database and application(s) to be ready is sequentially cumulative. Current architectures are limited to optimizing single queries at a time, which does not scale well in complex environments. The result is a less than optimal operational environment.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
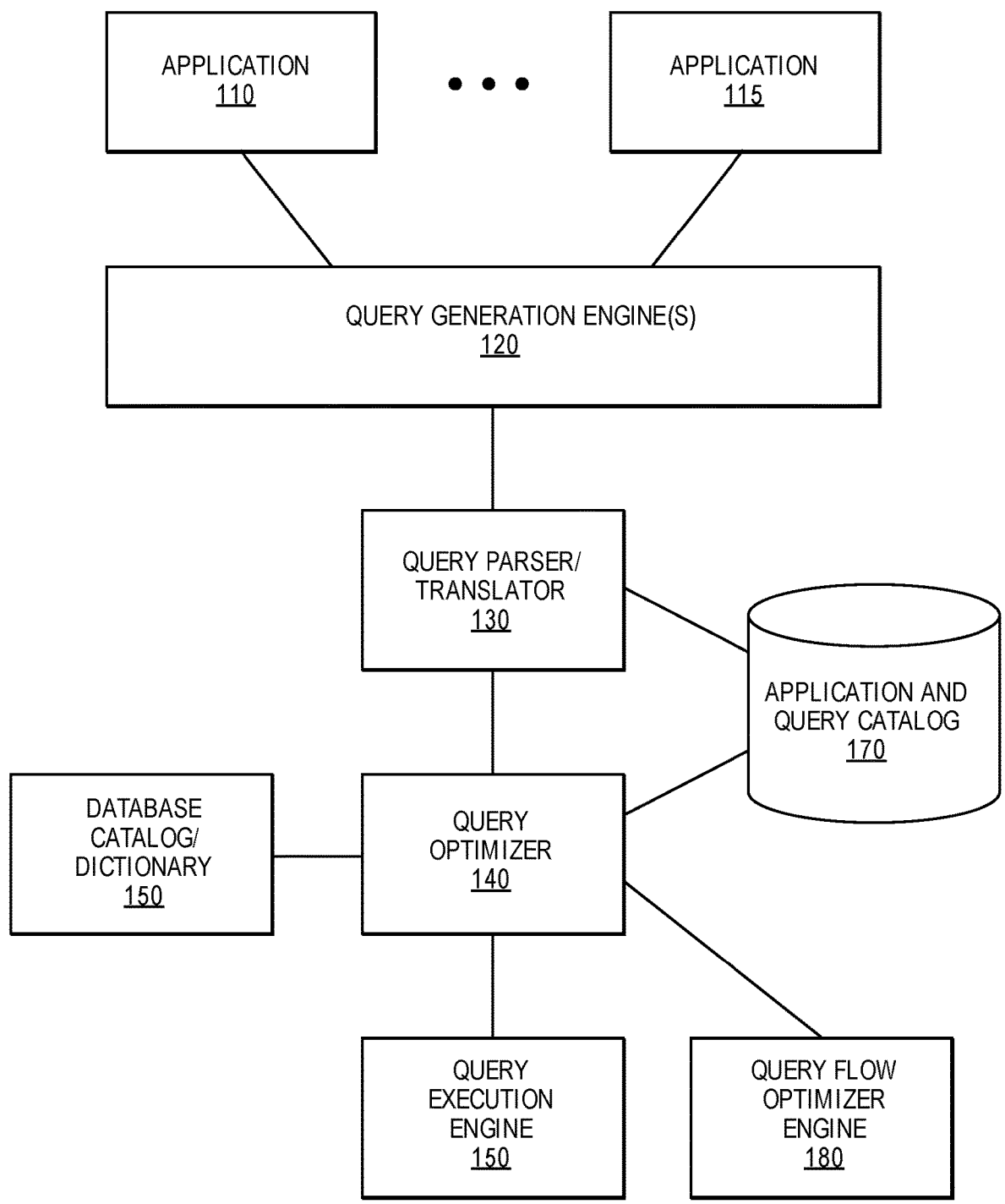
FIG. 1 is a block diagram of one embodiment of an architecture to provide an application-aware database system.

In the following description, numerous specific details are set forth. However, embodiments of the invention may be practiced without these specific details. In other instances, well-known structures and techniques have not been shown in detail in order not to obscure the understanding of this description.

There currently exists no comprehensive solution to solve the problem of predictive query-flow optimization as opposed to single query optimization discussed above. However, some attempts have been made to reduce the hard parse time of single queries by methods such as structured query language (SQL) stored outlines by storing the SQL execution plans in the database.

In current RDBMS architectures, there is no concept of storing metadata for applications, modules, and their related queries. For example, in Salesforce, there may be Sales, Service, or Marketing applications. Further, the modules within Sales application could be Opportunity Management, Lead Management, etc. Each of these modules may have different sets of queries for rendering their respective home pages on UI. Within the database, according to various embodiments, this metadata (e.g., application, module, queries) can be registered and stored like other database objects such as users, tables, indexes, packages, etc.

The techniques and mechanisms discussed herein can be utilized to create structures in a manner that provide the ability for the RDBMS to establish the context in terms the application for the optimizer to use this information to preload, parse and/or store execution plans in memory for queries expected to be received from the application server. Such established context can minimize the number of queries to be evaluated during startup as well as on an ongoing basis with the aim of eliminating hard parse time.

In one embodiment, the database can pre-parse the queries that are expected from application server, independent of the application server availability. By pre-parsing such queries, the time needed to serve the queries from the application server can be reduced, which provides a more efficient system.

In one embodiment, this concept can be extended to persist the current state of queries and their execution plans during the database shutdown, and bring them back to the same state on database restart. This mechanism can be utilized to propagate state of queries and execution plans to all the nodes in a multi-node database environment.

The embodiments described herein can provide significantly improved startup performance, hence reducing the response time for the customers. Further, it aids in significantly reducing disaster recovery time. The embodiments described herein provide a capability in the RDBMS to potentially pre-register applications, modules and queries for optimization. This can appreciably shorten the application response time. It further adds a layer of security by providing privileges to a defined set of users for each combination of application and modules.

By building the repository of queries and their related execution plans over time, the database will be able to identify an existing query and execution plans to be reused. This is especially useful where the queries are run in multi-tenancy applications where execution plans can be different for different tenants/organizations.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

For various embodiments herein, the following metadata, including object privileges, are utilized. In one embodiment, to implement an application-aware database, applications and modules are declared as database objects on which the database can take action as and when required. This can be implemented similar to currently used objects like users, tables, indexes, packages, etc. In one embodiment, SQL query and execution plans are also declared as database objects. These are registered with an application along with its modules and related set(s) of queries.

Using the techniques described herein, it is possible to declare the set of queries that are essential for each of the registered modules. Hence, the scheme of specific combinations of application, modules, and queries will be stored as metadata. In one embodiment there is provided creation and maintenance of metadata related to application, modules, and queries by the RDBMS. Additionally, the query set priority can be registered so that the database can parse and load in the prioritization order. In one embodiment, application architects/owners can then register/create application, modules, and queries with/in the database in the same manner as other objects are currently created. Once created/registered, the application, modules, and queries could be used for pre-parsing, loading and storing execution plans.

The registration with the database could be done using commands such as:
CREATE APPLICATION <App1>;
CREATE MODULE <Module1>FOR APPLICATION <App1>;
CREATE SQL_QUERY <query1>FOR MODULE <Module1>PRIORITY <1>;
CREATE SQL_QUERY <query2>FOR MODULE <Module1>PRIORITY <2>;
UPDATE EXECUTION_PLAN <plan1>DISABLE;
GRANT EXECUTE ON <App1>TO <User1>;
REVOKE EXECUTE ON <App1>FROM <User1>;

The above example would register an application App1 along with Module1 and queries query1, query2, accord priority 1 to query1 and priority 2 to query2, and allow execute privilege on App1 to User1. Providing such a granular, declarative way for the implementation of application-aware database to application architects, the RDBMS can use this metadata to pre-parse and cache queries and query execution plans, including those of connection pools coming from the appserver, and persist the query execution plans. This stored metadata can be used by the database at all startup times. As a result, the optimizer will do less work, save on time and database resources and arguably produce efficient, stable execution plans, especially for multi-tenancy SQL queries. Application architects, database administrators and SQL tuning professionals will be able to make adjustments to further fine-tune the matrix for optimal performance.

Thus, the techniques described herein optimize processing of "query flows" rather than individual SQL queries and also utilize relatively detailed application information to optimize query plans quickly and more efficiently.

In contrast to the techniques described herein, when reviewing current techniques two concepts stand out that point to limitations in existing architecture. One, the focus of the database optimizer is to optimize one query at a time. Two, the input parameters fed into the optimizer's decisions only include the structure of the query, statistics of objects referenced in the query and optimizer's execution features. There is no mechanism for optimizing query-flows or using application and user metadata as inputs to the query optimization process.

For example, in the case of Microsoft's SQL Server databases, the SQL Server Query Optimizer's purpose is to find an efficient physical execution plan that fulfills a query request. It attempts this by assigning estimated costs to various query execution plan alternatives and then choosing the plan alternative with the lowest estimated cost. The focus is on optimizing a single query at a time and the query optimizer relies on distribution statistics when it estimates the resource costs of different methods for extracting information from a table or index.

Similarly, IBM's DB2 UDB database optimizer documentation provides mechanisms for using a query graph model as input, the optimizer portion of the compiler generates many alternative execution plans for satisfying the query. To estimate the execution cost of each of these plans, the optimizer uses statistics for tables, indexes, columns and functions. It then chooses the plan with the smallest estimated execution cost. The optimizer uses the query graph model to analyze the query semantics and to obtain information about a wide variety of factors, including indexes, base tables, derived tables, subqueries, correlations, and recursion. Thus, in current database systems, each SQL query is optimized as a single query based only on statistics for database objects (e.g., tables, indexes) and not statistics or metadata related to the applications or users. Additionally, there is no provision to persist ongoing optimized plans and reuse those based on application and user information.

FIG. 1 is a block diagram of one embodiment of an architecture to provide an application-aware database system. The architecture of FIG. 1 can pre-parse queries that are expected from one or more applications (e.g., 110, 115), independent of application server availability. Pre-parsing such queries can cut down on the time needed to serve the queries from the application server. In one embodiment, the same concept can be extended to persist the current state of queries and their execution plans during database shutdown, and bring it back to the same state on database restart. In various embodiments, this mechanism can be utilized to propagate the state of queries and execution plans to all the nodes in a multi-node database environment.

Thus, as described in greater detail, the embodiments described herein not only addresses the three major limitations of current RDBMS architecture as discussed above but also can provide one or more of the following significant benefits: 1) improved start-up performance, hence reducing the response time for customers; 2) reduced disaster recovery time; 3) the capability in the RDBMS to pre-register applications, modules and queries for optimization, which can shorten application response time; 4) adding a layer of security by providing privileges to a defined set of users for each combination of application and modules; and 5) by building the repository of queries and their related execution plans over time, the database will be able to identify an existing query and execution plans to be reused, which is especially useful where the queries are run in multi-tenancy applications where execution plans can be different for different tenants/orgs.

Applications 110 and 115 can be any type of applications that generate database queries. In one embodiment, the database queries are built of structured query language (SQL) statements; however, other languages can also be supported. In the example of FIG. 1 only two applications are illustrated, but any number of applications can be supported. In one embodiment, the database queries are provided to query generation engine(s) 120, which functions to coordinate queries from multiple sources and send the queries to query parser/translator 130.

Query parser/translator 130 operates to parse, translate and/or otherwise process the queries to prepare the queries for execution in the database. In one embodiment, query parser/translator 130 is configured to have access to application and query catalog 170. As described in greater detail below, application and query catalog 170 stores information about queries and applications that generate queries to provide the benefits discussed above.

Query optimizer 140 is configured to have access to query parser/translator 130, application and query catalog 170, query flow optimizer engine 180 and database database/catalog 150. Query optimizer 140 operates to optimize queries using information from these sources. In one embodiment, query optimizer 140 can copy a previous optimization for an incoming query from application and query catalog 170. If a query has not been previously optimized, query optimizer 140 can write query optimization information to application and query catalog 170. In one embodiment, query flow optimizer engine 180 can provide predictive information so that optimized queries can be preloaded.

Query optimizer 140 provides optimized queries to query execution engine 150. Query execution engine 150 executes the optimized queries against one or more database nodes (not illustrated in FIG. 1).

Figure 2:
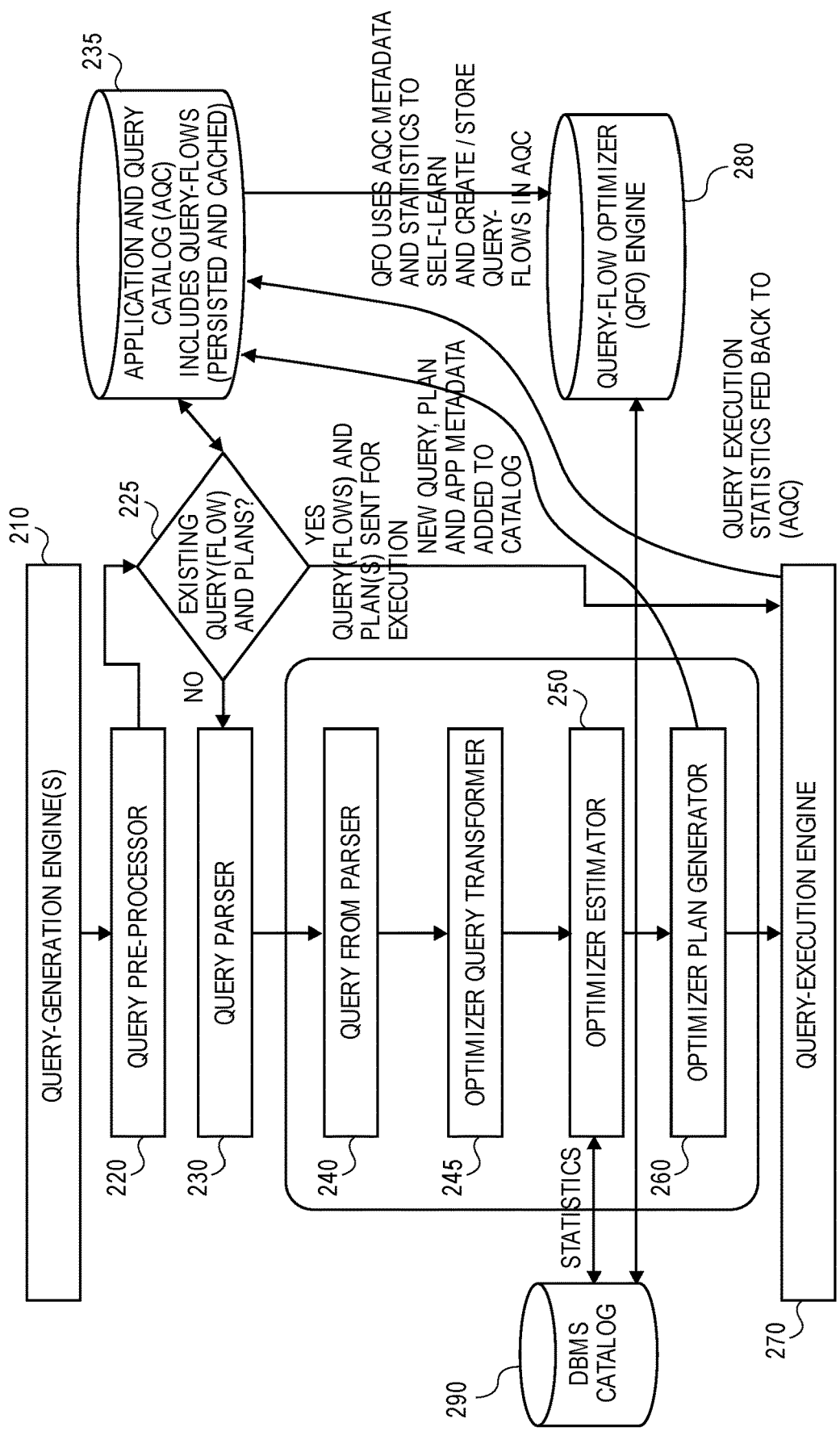
FIG. 2 is a detailed flow diagram of one embodiment of an application aware database query execution technique.

FIG. 2 is a detailed flow diagram of one embodiment of an application aware database query execution technique. In the example of FIG. 2, query generation engine(s) 210 are applications or other components that generate database queries. Query generation engine(s) 210 provide the queries to query pre-processor 220.

In one embodiment, query pre-processor 220 functions to establish whether, for a given query arriving for execution (225), there exists a corresponding entry in the application and query catalog (AQC) 235 with a valid and current execution plan. If so, query pre-processor 220 sends the query along with the retrieved execution plan to query-execution engine 270 for execution. If not (225), the query is passed to query parser 230 for further processing. In one embodiment, once an execution plan is generated for the query, the query and execution plan are dispatched to AQC 235 for persistence.

Conceptually, AQC 235 lays out the ground work for application-aware databases. In one embodiment, AQC 235 provides a persistence layer for storing and caching application metadata (e.g., modules, actions, query-flows, tenant and user information and statistics) as well as storing historical execution plans for queries, which can be retrieved for use without the need for a hard parse, given that the plan is not invalidated due to any of the factors that can render it obsolete based on detailed factors already established in existing architectures.

In one embodiment, application metadata not only includes the capability to register applications, modules and/or actions but also includes the capability to register business entities and their relationships rather than simply the standard tables and foreign keys. This is a distinction from existing architectures because the database optimizer can make better decisions during query optimization if it knows the structure of application business entities comprising of individual tables and how business entities are related to each other.

AQC 235 provides the database (or other components) with full knowledge of applications and their components from which queries are expected to arrive for execution. In one embodiment, based on the knowledge of applications, business entities, modules, actions and/or other metadata, individual queries can be optimized and also provide inputs to the query flow optimizer (QFO) engine 280 for optimization of query-flows rather than individual queries. QFO engine 280 is described in greater detail below.

In one embodiment, each query sent from the query generation engine(s) 210 can carry with it application metadata as discussed above. In one embodiment, the query metadata includes the application, module, and action from where it originated as well, metadata of business entities involved as well as the user's environment and context attributes. Other query metadata configurations can be supported as well. This metadata will be used as inputs to the query and query-flow optimization processes. Once the query has been executed, the query execution statistics (e.g., number of executions, elapsed time, processor utilization, number of rows processed, logical and physical reads, and memory utilization) can be captured and stored in AQC 235.

In one embodiment, in addition to the application and query metadata, AQC 235 can also store tenant metadata along with usage metadata that could include attributes that can be used as inputs for query and query-flow optimization. In one embodiment, this includes capturing and storing metadata and attributes such as which user from which tenant organization typically uses which applications, modules and actions as well as the usage frequency. The application usage patterns of users thus captured and interpreted can provide information for QFO 280 to apply predictive intelligence techniques to prepare query-flows for execution as early as when a user logs in to the application.

As discussed above, QFO 280 optimizes query-flows based on metadata stored in AQC 235. In one embodiment, as applications are used, AQC 235 builds the necessary data about queries and their execution statistics. In one embodiment, QFO 280 utilizes machine learning techniques utilizing the data in AQC 235 to build predictive intelligence in order to form query-flows and store them back in AQC 235 and improve such query-flows based on actual execution statistics in the future.

In one embodiment, supervised learning algorithms can be used for this purpose which make predictions on given set of samples stored in AQC 235. In these algorithms, models are developed through a training process to make predictions and adjusted for correct outcome when mistakes are detected. This is an iterative process that helps the model reach the desired prediction accuracy. As more training data is added, the models become more robust. Such a closed-loop of persisting all the required metadata and statistics and then utilizing machine learning and data science to form and predict query-flows provides the backbone of QFO 280.

In one embodiment, QFO 280 can utilize the intelligence about intermediate result sets of queries and sub-queries that can become useful for re-use as well as optimization of multiple queries and entire query-flows. For example, once all the metadata about applications, modules, actions, business entities, their relationships, users and their query execution patterns are available to the optimizer, the optimizer can make intelligent decisions when optimizing queries and query-flows.

Once query parser 230 has the optimized query, the optimized query is passed (240) to optimizer query transformer 245 that can provide any necessary transformations and pass the query to optimizer estimator 250. In one embodiment, optimizer estimator 250 can utilize query statistics from DBMS catalog 290 to estimate costs for the query that can be used by optimizer plan generator 260 to generate an execution plan for the query. The execution plan can be stored in AQC 235.

The execution plan can be provided to query execution engine 270 for execution against one or more database nodes (not illustrated in FIG. 2). In one embodiment, the application-aware database can exist within an on-demand services environment, which can support multitenancy.

Figure 3:
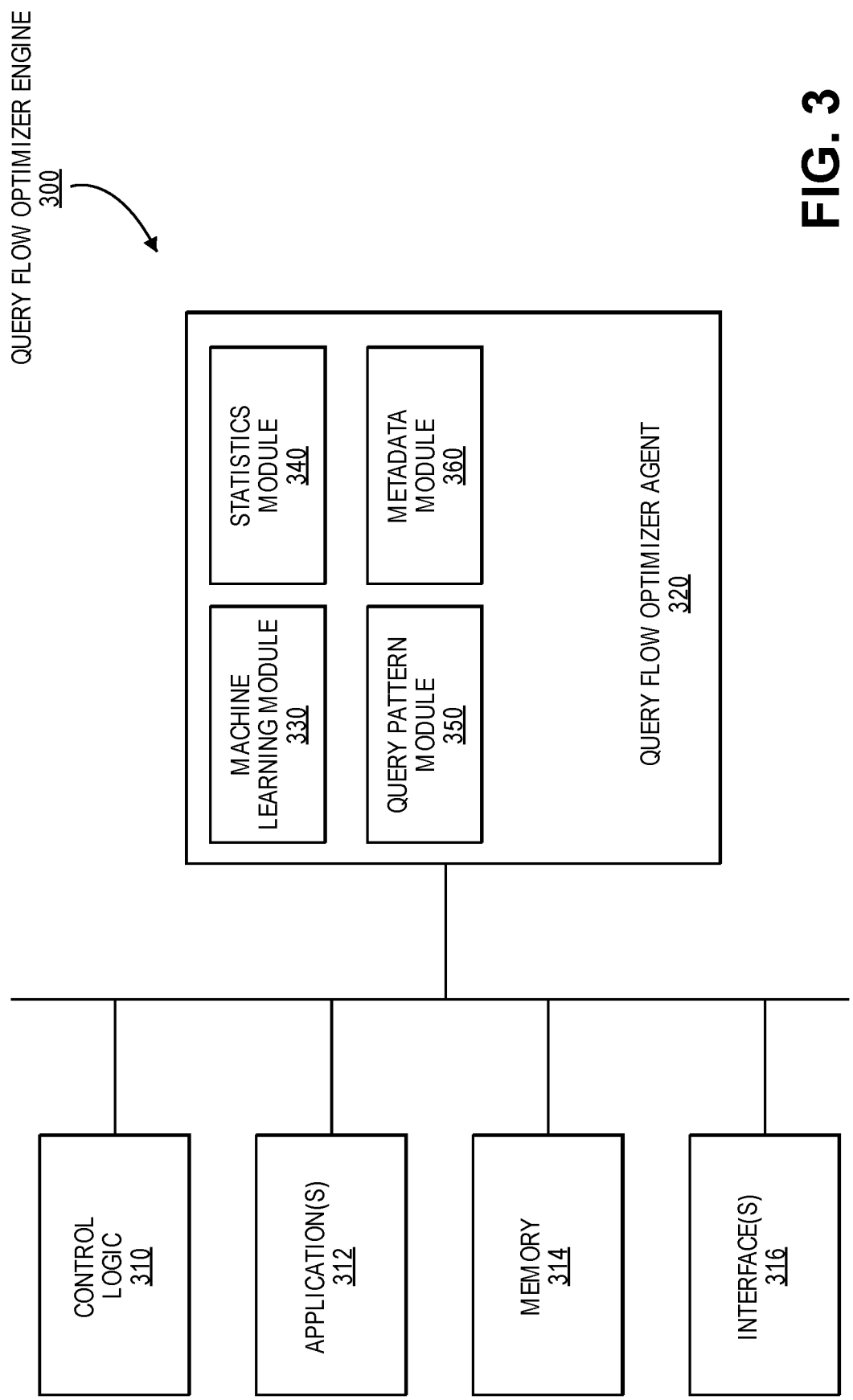
FIG. 3 is a block diagram of one embodiment of a query flow optimizer engine.

FIG. 3 is a block diagram of one embodiment of a query flow optimizer engine. In one embodiment, query flow optimizer engine 300 includes control logic 310, which implements logical functional control to direct operation of query flow optimizer engine 300, and/or hardware associated with directing operation of query flow optimizer engine 300. Logic may be hardware logic circuits and/or software routines. In one embodiment, query flow optimizer engine 300 can be part of an on-demand services environment, various example embodiments of which are described in greater detail below.

In one embodiment, query flow optimizer engine 300 includes one or more applications 312, which represent code sequence and/or programs that provide instructions to control logic 310. Applications can provide various functional components of query flow optimizer engine 300.

Query flow optimizer engine 300 includes memory 314, which represents a memory device and/or access to a memory resource for storing data and/or instructions. Memory 314 may include memory local to query flow optimizer engine 300, as well as, or alternatively, including memory of the host system on which query flow optimizer engine 300 resides.

In one embodiment, query flow optimizer engine 300 also includes one or more interface(s) 316, which represent access interfaces to/from (an input/output interface) query flow optimizer engine 300 with regard to entities (electronic or human) external to query flow optimizer engine 300. Interface(s) 316 can include, for example, the various APIs utilized to perform the functionality described above and/or the user interface discussed above. Other and/or different and/or additional interfaces can also be provided.

Query flow optimizer engine 300 also includes query flow optimizer agent 320, which includes one or more functions or modules that enable query flow optimizer engine 300 to provide the records management services as described above. The example of FIG. 3 provides several modules that may be included in query flow optimizer agent 320; however, different and/or additional modules may also be included. Example modules that may be involved include machine learning module 330, statistics module 340, query pattern module 350 and metadata module 360. The modules of query flow optimizer agent 320 can be hardware, software or a combination thereof.

Machine learning module 330 applies machine learning techniques to queries and associated metadata to develop models that can be utilized to perform predictive query functions. For example, certain applications may provide specific sets of data that are based on consistent sequences of database queries. If a first query is received from the application, machine learning module 330 may determine that the sequence has started and the following queries can be preloaded for execution or can be executed before receiving the queries. As another example, predictive querying can be based on time, so that knowing a specific query is run regularly at a specific time, that query can be run before that time so that the results appear immediate to a user. Many other predictive situations can also be provided.

Statistics module 340 operates to manage and/or generate statistics that are utilized by machine learning module 330 to perform the predictive query functionality discussed above. Query pattern module 350 operates to maintain data corresponding to, and track data for, query patterns. These patterns can include, for example, specific sequences of queries, queries from specific applications and/or users, timing of queries, etc. Metadata module 360 operates to maintain metadata for query pattern module 350 and/or statistics module 360 to perform the functions described above.

Figure 4:
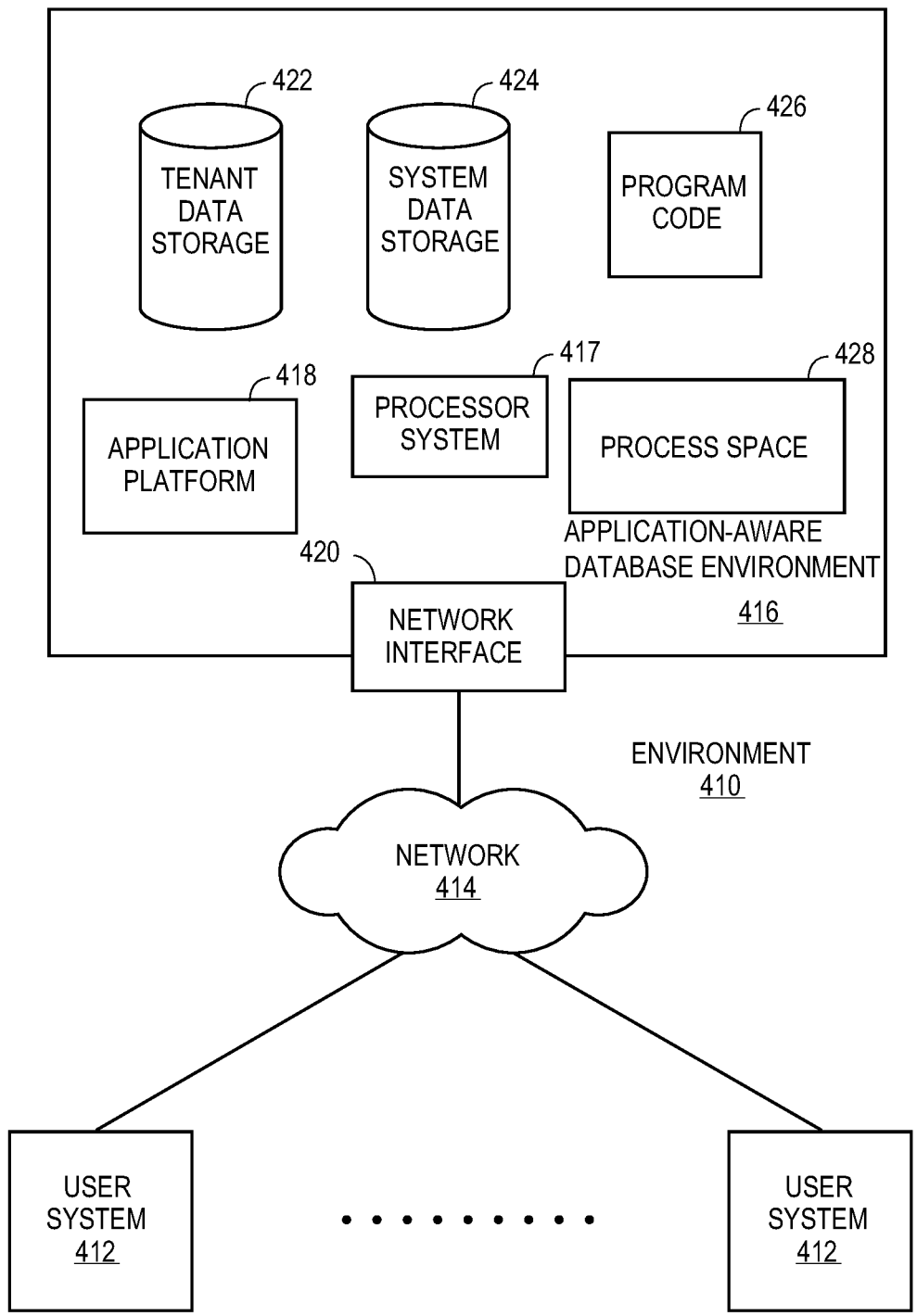
FIG. 4 illustrates a block diagram of an environment where an application-aware database service providing predictive execution of queries and query flows might be used.

FIG. 4 illustrates a block diagram of an environment 410 wherein an on-demand database service might be used. Environment 410 may include user systems 412, network 414, application-aware database environment 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in herein FIG. 4 (and in more detail in FIG. 5) user systems 412 might interact via a network 414 with an on-demand database service, which is application-aware database environment 416.

An on-demand database service, such as application-aware database environment 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). A database image may include one or more database objects. A relational database management system (RDMS) or the equivalent may execute storage and retrieval of information against the database object(s). Application platform 418 may be a framework that allows the applications of application-aware database environment 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with application-aware database environment 416, that user system has the capacities allotted to that salesperson. However, while an administrator is using that user system to interact with application-aware database environment 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 412 might communicate with application-aware database environment 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at application-aware database environment 416. Such an HTTP server might be implemented as the sole network interface between application-aware database environment 416 and network 414, but other techniques might be used as well or instead. In some implementations, the interface between application-aware database environment 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, application-aware database environment 416, shown in FIG. 4, implements a web-based customer relationship management (CRM) system. For example, in one embodiment, application-aware database environment 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, application-aware database environment 416 implements applications other than, or in addition to, a CRM application. For example, application-aware database environment 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the application-aware database environment 416.

One arrangement for elements of application-aware database environment 416 is shown in FIG. 4, including a network interface 420, application platform 418, tenant data storage 422 for tenant data 423, system data storage 424 for system data 425 accessible to application-aware database environment 416 and possibly multiple tenants, program code 426 for implementing various functions of application-aware database environment 416, and a process space 428 for executing MTS system processes and tenant-specific processes, such as running applications as part of an application hosting service. Additional processes that may execute on application-aware database environment 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 412 to access, process and view information, pages and applications available to it from application-aware database environment 416 over network 414. Each user system 412 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by application-aware database environment 416 or other systems or servers. For example, the user interface device can be used to access data and applications hosted by application-aware database environment 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Core series processor or the like. Similarly, application-aware database environment 416 (and additional instances of an MTS, where more than one is present) and all of their components might be operator configurable using application(s) including computer code to run using a central processing unit such as processor system 417, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring application-aware database environment 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each application-aware database environment 416 is configured to provide webpages, forms, applications, data and media content to user (client) systems 412 to support the access by user systems 412 as tenants of application-aware database environment 416. As such, application-aware database environment 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
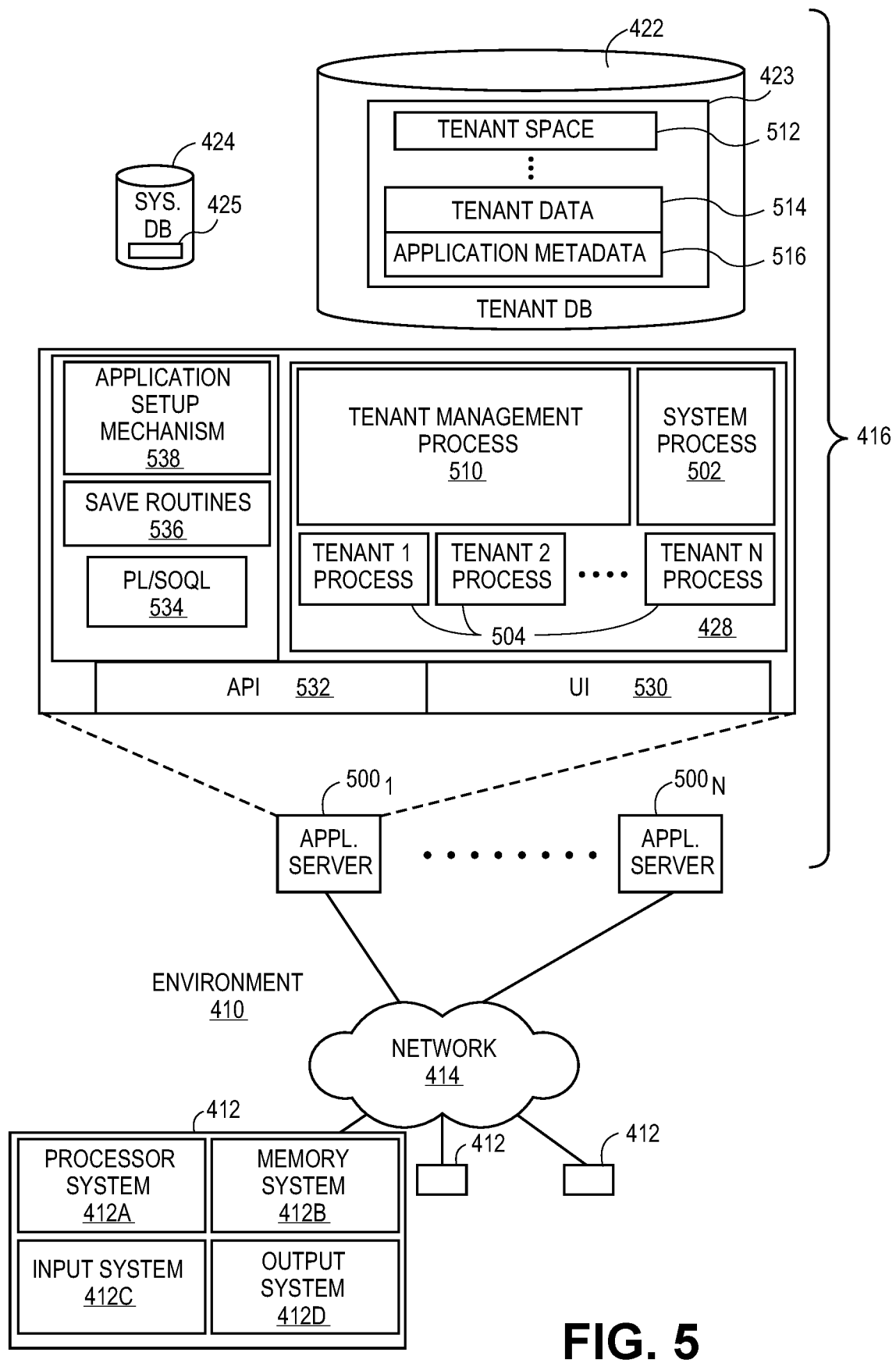
FIG. 5 illustrates a block diagram of an environment where an application-aware database service providing predictive execution of queries and query flows might be used.

FIG. 5 also illustrates environment 410. However, in FIG. 5 elements of application-aware database environment 416 and various interconnections in an embodiment are further illustrated. FIG. 5 shows that user system 412 may include processor system 412A, memory system 412B, input system 412C, and output system 412D. FIG. 5 shows network 414 and application-aware database environment 416. FIG. 5 also shows that application-aware database environment 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$400_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, application-aware database environment 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, application-aware database environment 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to application-aware database environment 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 BIG-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, application-aware database environment 416 is multi-tenant, wherein application-aware database environment 416 handles storage of, and access to, different objects, data and applications across disparate users and organizations.

As an example of storage, one tenant might be a company that employs a sales force where each salesperson uses application-aware database environment 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by application-aware database environment 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, application-aware database environment 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from application-aware database environment 416 that may require sending one or more queries to tenant data storage 422 and/or system data storage 424. Application-aware database environment 416 (e.g., an application server 500 in application-aware database environment 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:
1. A method, comprising:
 maintaining, in a database, a repository in which applications, application modules and previously received database queries and execution plans are declared as database objects, wherein query metadata and execution plan metadata indicates an application or applica- tion module that was a source of the corresponding previously received database queries and execution plans;

determining a set of essential queries for one or more applications or application modules;

storing a scheme of a combination of application, application module and corresponding database queries as metadata in the database;

pre-parsing and caching, based on the scheme metadata, one or more retrieved database queries and execution plans according to a prioritization order for predicted subsequent database queries that are expected to be received prior to receiving the subsequent database queries; and beginning execution of the one or more retrieved database queries prior to receiving the query from outside the repository independent of source application server availability.

2. The method of claim 1, wherein the repository is maintained with a non-volatile memory device.

3. The method of claim 1, wherein the previously received database queries and corresponding metadata are stored as database objects in a database.

4. The method of claim 1, wherein the metadata further comprises tenant information corresponding to the previously received database queries.

5. The method of claim 1, wherein the queries stored in the repository are optimized queries.

6. The method of claim 1, wherein the repository further maintains execution plans corresponding to the previously received database queries.

7. A non-transitory computer-readable medium having stored thereon instructions that, when executed by one or more processors, are configurable to cause the one or more processors to:

maintain, in a database, a repository in which applications, application modules and previously received database queries and execution plans are declared as database objects, wherein query metadata and execution plan metadata indicates an application or application module that was a source of the corresponding previously received database queries and execution plans;

determine a set of essential queries for one or more applications or application modules;

store a scheme of a combination of application, application module and corresponding database queries as metadata in the database;

pre-parse and cache, based on the scheme metadata, one or more retrieved database queries and execution plans according to a prioritization order for predicted subsequent database queries that are expected to be received prior to receiving the subsequent database queries; and begin execution of the one or more retrieved database queries prior to receiving the query from outside the repository independent of source application server availability.

8. The non-transitory computer-readable medium of claim 7, wherein the repository is maintained with a non-volatile memory device.

9. The non-transitory computer-readable medium of claim 7, wherein the previously received database queries and corresponding metadata are stored as database objects in a database.

10. The non-transitory computer-readable medium of claim 7, wherein the metadata further comprises tenant information corresponding to the previously received database queries.

11. The non-transitory computer-readable medium of claim 7, wherein the queries stored in the repository are optimized queries.

12. The non-transitory computer-readable medium of claim 7, wherein the repository further maintains execution plans corresponding to the previously received database queries.

13. A system comprising:

a memory device; and one or more processors coupled with the memory device, the one or more processors configurable to maintain, in a database, a repository in which applications, application modules and previously received database queries and execution plans are declared as database objects, wherein query metadata and execution plan metadata indicates an application or application module that was a source of the corresponding previously received database queries and execution plans, to determine a set of essential queries for one or more applications or application modules, to store a scheme of a combination of application, application module and corresponding database queries as metadata in the database, to pre-parse and cache, based on the scheme metadata, one or more retrieved database queries and execution plans according to a prioritization order for predicted subsequent database queries that are expected to be received prior to receiving the subsequent database queries, and to begin execution of the one or more retrieved database queries prior to receiving the query from outside the repository independent of source application server availability.

14. The system of claim 13, wherein the previously received database queries and corresponding metadata are stored as database objects in a database.

15. The system of claim 13, wherein the metadata further comprises tenant information corresponding to the previously received database queries.

16. The system of claim 13, wherein the queries stored in the repository are optimized queries.

17. The system of claim 13, wherein the repository further maintains execution plans corresponding to the previously received database queries.

* * * * *